United States Patent
Futa, Jr. et al.

(10) Patent No.: US 6,892,544 B2
(45) Date of Patent: May 17, 2005

(54) FLOW DIVIDER & PURGE AIR SYSTEM FOR A GAS TURBINE ENGINE

(75) Inventors: Paul W. Futa, Jr., North Liberty, IN (US); David W. Rice, Niles, MI (US); Thomas A. Nieter, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 256 days.

(21) Appl. No.: 10/135,233

(22) Filed: Apr. 29, 2002

(65) Prior Publication Data

US 2003/0200754 A1 Oct. 30, 2003

(51) Int. Cl.[7] .......................... F02C 7/228; F02C 7/232
(52) U.S. Cl. .................... 60/776; 60/778; 60/39.094; 60/787
(58) Field of Search .................. 60/776, 778, 787, 60/39.094

(56) References Cited

U.S. PATENT DOCUMENTS

| | | | |
|---|---|---|---|
| 3,367,107 A | * | 2/1968 | Richardson et al. ............ 60/786 |
| 4,041,695 A | | 8/1977 | Harper et al. ............... 60/39.02 |
| 4,344,280 A | * | 8/1982 | Minakawa et al. ......... 60/39.092 |
| 4,964,270 A | | 10/1990 | Taylor et al. ............. 60/39.094 |
| 5,129,222 A | * | 7/1992 | Lampe et al. .............. 60/39.27 |
| 5,277,023 A | | 1/1994 | Bradley et al. |
| 5,339,636 A | | 8/1994 | Donnelly et al. .............. 60/734 |
| 5,448,882 A | | 9/1995 | Dyer et al. |
| 5,809,771 A | | 9/1998 | Wernberg ................. 60/39.094 |
| 6,195,978 B1 | * | 3/2001 | Futa, Jr. ................... 60/39.094 |
| 6,314,998 B1 | * | 11/2001 | Futa, Jr. et al. .......... 60/39.094 |
| 6,405,524 B1 | * | 6/2002 | Mistry et al. ............. 60/39.091 |

FOREIGN PATENT DOCUMENTS

| | | |
|---|---|---|
| EP | 0 761 946 A1 | 3/1997 |
| EP | 1 182 401 A1 | 2/2002 |

* cited by examiner

Primary Examiner—Ted Kim
(74) Attorney, Agent, or Firm—Larry J. Palguta

(57) ABSTRACT

A purge air and fuel flow divider module (15) independently directs fuel flow to a plurality of manifolds (25, 27 and 29) and independently purges fuel from these manifolds with air when they are not flowing fuel. A secondary manifold (29) is filled with fuel before flowing metered burn flow to it and fuel flow is apportioned between a primary manifold (27) and the secondary manifold (29) during secondary manifold metered burn flow. Three manifolds are disclosed, a primary manifold (27), a secondary manifold (29) and a start or pilot manifold (25), each containing fuel nozzles (31, 33). A manifold main housing (61) contains a purge valve (41) and two three-way solenoids (37, 39) controlling respectively a secondary transfer valve (43) and a pilot nozzle transfer valve (45). Depending on the requirements, the solenoids position the valves to either provide manifold fill fuel, burn flow fuel or purge air to their respective manifolds. When fuel is shut off to the manifold, the purge valve (41) is remotely commanded to purge the primary manifold (27) with air.

15 Claims, 5 Drawing Sheets

FLOW DIVIDER & PURGE AIR SYSTEM FOR A GAS TURBINE ENGINE

BACKGROUND OF THE INVENTION

1. Field of the Invention

This invention was made with Government support under Contract No. DAAE07-00-C-N086 awarded by the United States Army. The Government has certain rights in this invention.

2. Description of the Related Art

Gas turbine engines are frequently required to direct burn flow to various manifolds containing fuel nozzles and to purge residual fuel from these manifolds when they are not flowing fuel. In one known system, fuel flow to a start manifold is stopped after starting the engine by closing one solenoid to block metered fuel flow to the starter manifold and opening a second downstream solenoid leading to a holding tank. Pressure in the combustion chamber then backflows dirty combustion gases from the combustion chamber through the nozzles and to the holding tank. It is desirable to avoid the flow of dirty combustion gases through the start manifold and to eliminate the weight and bulk of a holding tank.

In another known system illustrated by U.S. Pat. No. 4,041,695, purging of both primary and secondary manifolds at engine cessation is achieved using a fuel flow solenoid and an air flow solenoid which operate inverse to one another, that is one is closed while the other is open and visa versa. Clean engine compressor air from an accumulator and filter purge both primary and secondary manifolds at the same time, but only upon engine cessation. This patent also teaches the use of a plurality of valves that open and close based on pressure drops to achieve fuel flow division between the primary and secondary manifolds. It is desirable to achieve manifold purging at times other than only at engine cessation. The capability to purge a particular manifold without purging other manifolds at the same time is also desirable.

SUMMARY OF THE INVENTION

The present invention provides solutions to the above concerns by providing a fuel flow dividing and purge module having independent pilot nozzle and secondary nozzle flow control valves which, when fuel flow ceases, supply high pressure air to purge the corresponding manifold.

The invention comprises, in one form thereof, a gas turbine engine fuel supply system which selectively supplies fuel to a plurality of engine fuel manifolds from a source of metered fuel and a source of unmetered fuel at a pressure higher than that of the metered fuel. There is also a source of high pressure air, such as the engine compressing section. A pilot nozzle valve is operable in one condition to supply fuel from the unmetered fuel source to an engine start manifold during engine start-up and in another condition to direct high pressure air from the air source to the start manifold to purge fuel from the start manifold. A pilot nozzle control solenoid normally supplies pressure from the unmetered source to control the pilot nozzle valve to the another condition, and is energizable to supply pressure from the unmetered source to control the pilot nozzle valve to the one condition where unmetered fuel flows through the control solenoid and through the pilot valve to the start manifold. A secondary nozzle valve is selectively operable in a first condition to direct high pressure air from the air source to an engine secondary fuel manifold to purge fuel from the secondary manifold, in a second condition to supply fuel from the metered fuel source to the secondary manifold, and in a third transitional condition to supply from the unmetered source to the secondary fuel manifold. A secondary nozzle control solenoid normally supplies pressure from the unmetered source to control the secondary nozzle valve to the first condition and is energizable to transition from the first condition to the second condition.

An advantage of the present invention is that engine hesitation upon converting from primary manifold fuel flow to combined primary and secondary manifold fuel flow is minimized by precharging the secondary manifold prior to commencing flow therefrom.

Another advantage is that fuel leakage into the nozzles is minimized.

A further advantage is that solenoid size and weight is minimized by not flowing metered fuel through those solenoids.

One feature of the present invention is that start manifold purge air flow continues throughout engine operation.

Another feature is that upon cessation of fuel flow from any manifold, that manifold is purged of remaining fuel.

A further feature is that pilot or start manifold fuel supply is independent of the metered fuel supply.

BRIEF DESCRIPTION OF THE DRAWINGS

Corresponding reference characters indicate corresponding parts throughout the several drawing views.

DETAILED DESCRIPTION OF THE INVENTION

Figure 1:
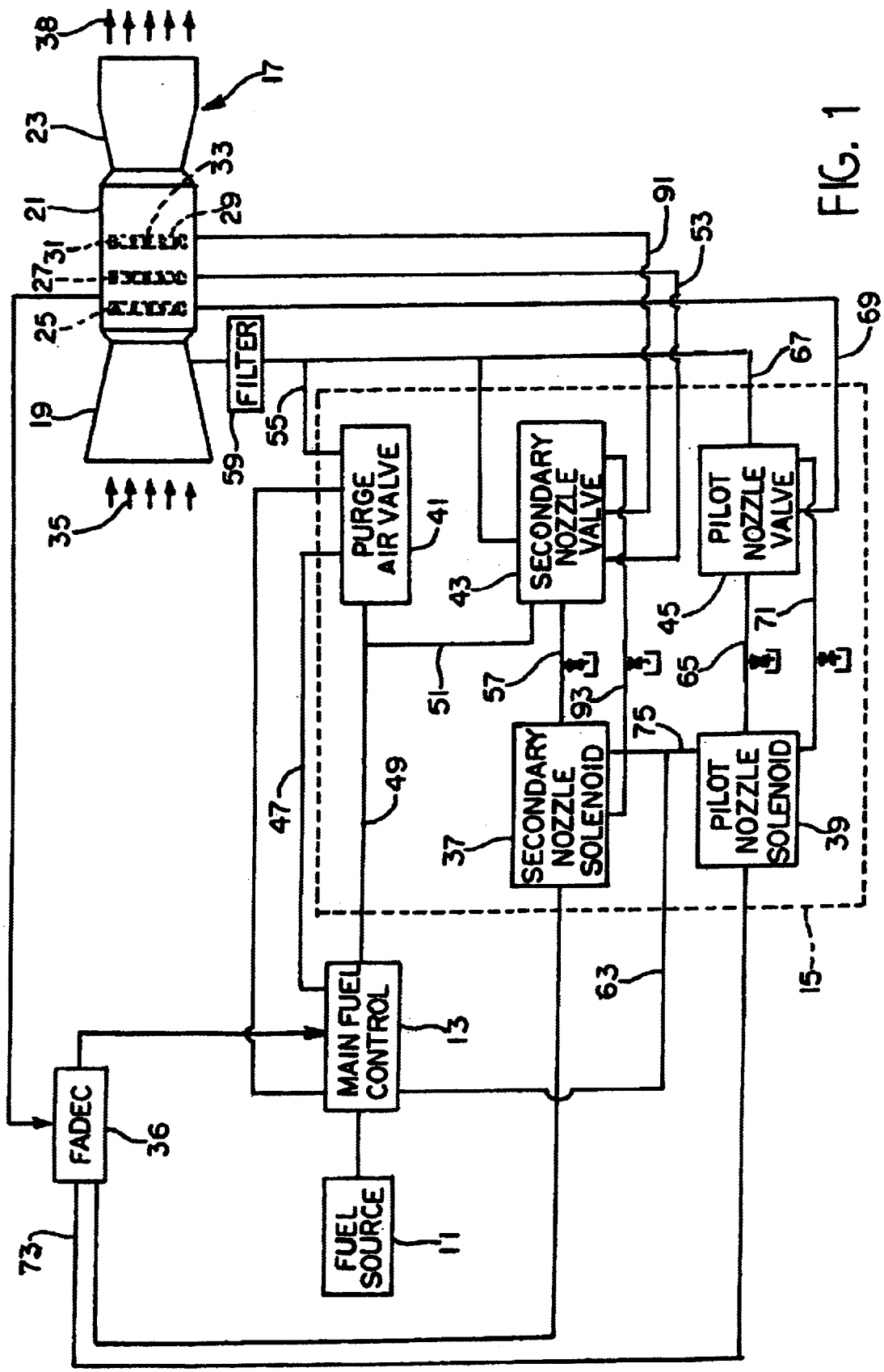
FIG. 1 is a schematic illustration of a fuel supply system for a gas turbine engine according to the invention in one form.
Figure 2:
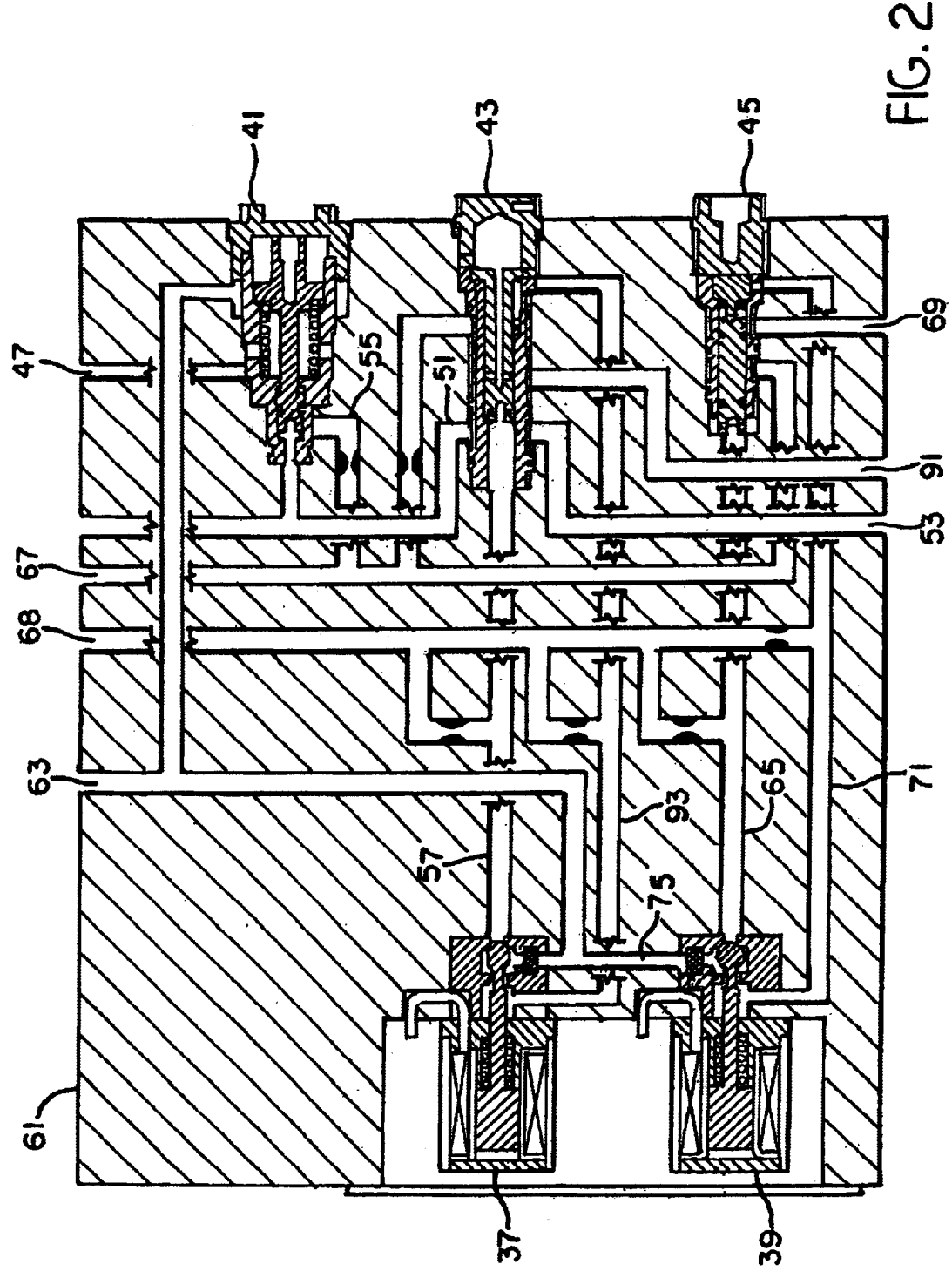
FIG. 2 is a more detailed illustration of the purge air/fuel flow divider module of FIG. 1.
Figure 3:
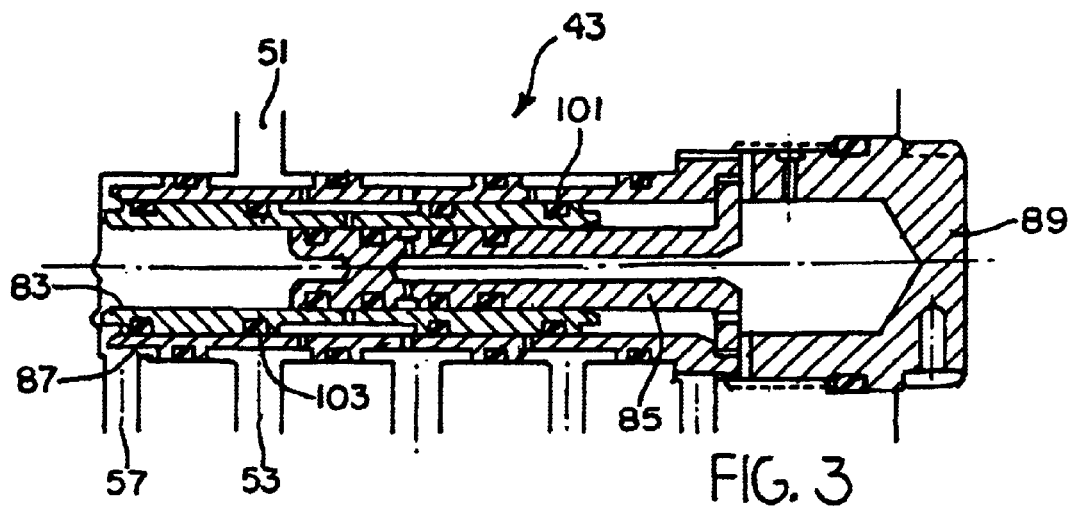
FIG. 3 is a cross-sectional illustration of the secondary nozzle valve of FIG. 2 in the run position.

Referring now to the drawings and particularly to FIGS. 1 and 2, there is shown a fuel supply system for a gas turbine engine comprising a source 11, fuel control 13 and purge air/fuel flow divider module 15 supplying fuel to the engine 17. The engine 17 includes an inlet air compressing section 19, a combustion region 21 and a turbine section 23. Inlet air flow is illustrated at 35 and air flow exiting the exhaust nozzle portion of the engine is indicated at 37. A plurality of fuel supply manifolds 25, 27 and 29 selectively supply fuel to the combustion region through fuel nozzles such as 31 and 33. The manifolds may, for example, be generally annular hollow structures with the fuel nozzles distributed about the inner annular surfaces. A start or pilot manifold 25, primary manifold 27 and secondary manifold 29 are illustrated. The fuel control 13 functions conventionally to reduce fuel flow from the source 11 and supply a metered flow by way of the module 15 to the primary manifold during operation. The primary manifold flow path is from fuel control 13 by way of conduits or lines 49 and 51 through secondary nozzle valve 43 to line 53 and the primary manifold 27. At start-up, high pressure unfettered fuel from main fuel control 13 is supplied by way of lines 63, 75, 71 and 69 to start manifold 25. After starting the engine, fuel flow to the start or pilot manifold is interrupted and that manifold purged by air flow along line 67, through pilot nozzle valve 45 and line 69. The restricted low pressure return lines are shown as four simple sumps in FIG. 1, but are shown as individual restricted conduits connected to a common return line 68 within the manifold 61 in FIG. 2.

Figure 6:
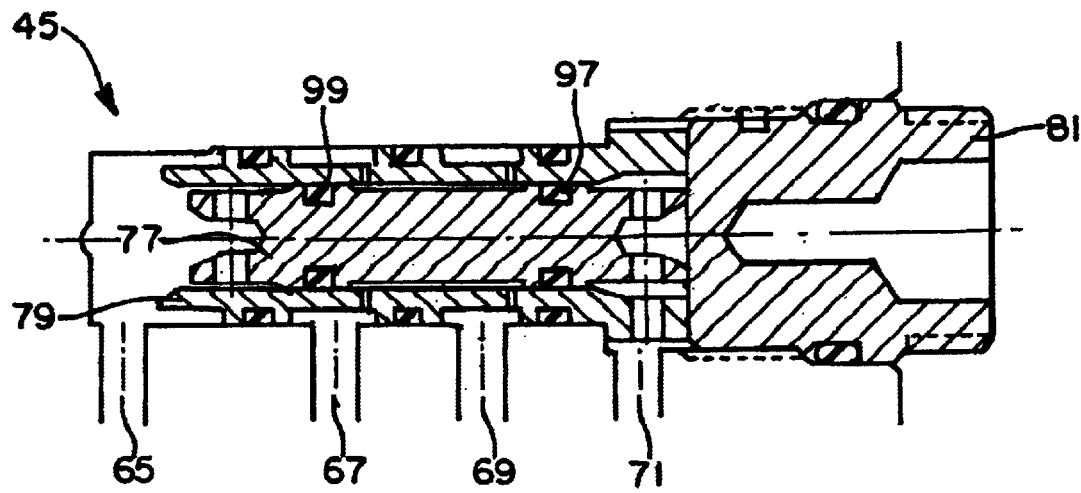
FIG. 6 is a cross-sectional illustration of the pilot nozzle valve of FIG. 2 in the purge position.
Figure 7:
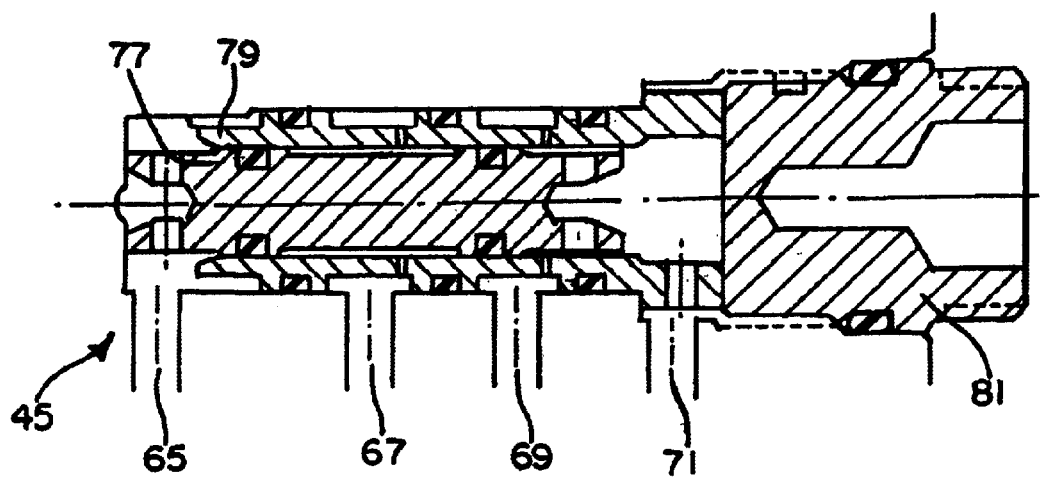
FIG. 7 is a cross-sectional illustration of the pilot nozzle valve of FIG. 2 in the run position.

The pilot nozzle valve 45 is best shown in FIGS. 2, 6 and 7 and comprises a movable valve spool 77 having a given stroke, a stationary sleeve 79 housing the valve spool and a cover 81. TEFLON dynamic cap seals energized by fluorosilicone O-rings 97 and 99 control leakage. The valve 45 functions to either supply fuel flow or purge air to the pilot nozzles upon command from the electronic control unit 36 on line 73. Electronic control unit may be a FADEC (full authority digital engine control). Control of valve 45 is independent of operation of the primary and secondary nozzles. In the de-energized position of the pilot solenoid 39, the solenoid supplies high pressure on line 65 to translate the valve spool toward the right, i.e., toward the cover. In this position as shown in FIG. 6, purge air is connected to the pilot nozzles by way of lines 67 and 69. When the solenoid 39 is energized, it assumes the position illustrated in FIG. 2 and high pressure from main fuel control 13 is supplied to the cover end by way of lines 63, 75 and 71 causing the spool to move toward the left away from the cover so that high pressure from main fuel control 13 is connected to the pilot nozzles as shown in FIG. 7. After starting the engine, the solenoid 39 is de-energized and purge air continues to flow during normal engine operation and at engine cessation.

Figure 4:
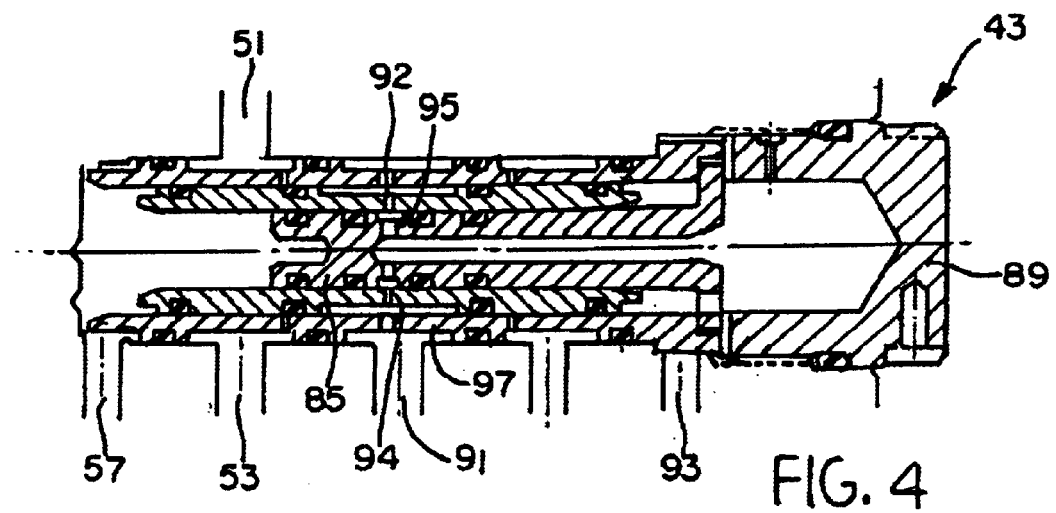
FIG. 4 is a cross-sectional illustration of the secondary nozzle valve of FIG. 2 in the manifold fill position.
Figure 5:
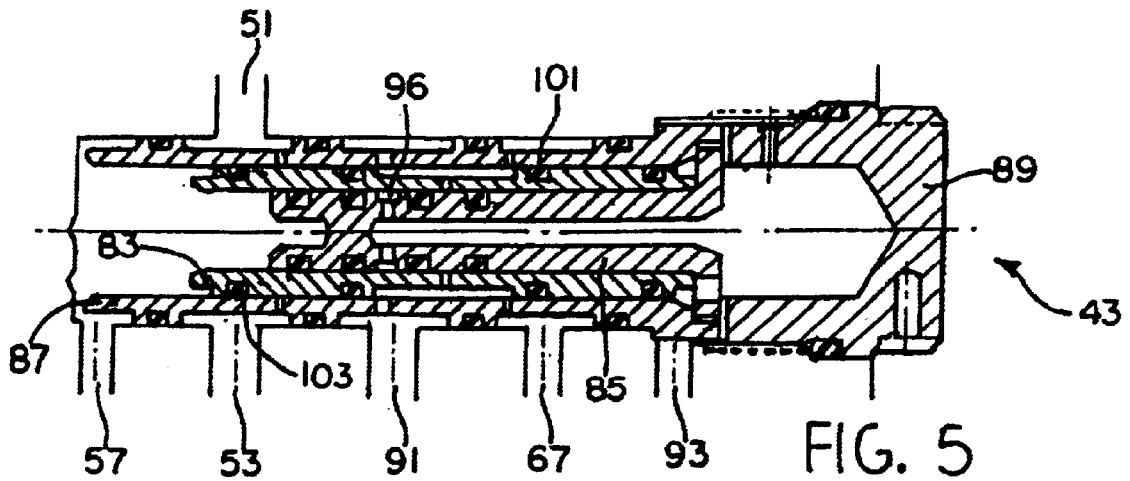
FIG. 5 is a cross-sectional illustration of the secondary nozzle valve of FIG. 2 in the purge position.

The secondary nozzle valve 43 detailed in FIGS. 2–5 comprises a movable valve spool 83 having a given stroke, a stationary stator 85 inside the spool, a stationary sleeve 87 housing the valve spool and a cover 89. TEFLON dynamic cap seals energized by fluorosilicone O-rings such as 101 and 103 control leakage. Secondary nozzle valve 43 provides three functions. During the portion of its stroke as illustrated in FIG. 5, it supplies purge air to the secondary nozzles when there is no fuel flow requirement to the secondary nozzles. It also functions to preliminarily fill the secondary manifold 29 prior to turning the secondary nozzles on. This occurs during mid-stroke of the spool 83 as illustrated in FIG. 4. Finally, it functions to stage metered flow to the secondary nozzles to a flowing condition. At one extreme of the valve 43 spool 83 travel, as shown by FIG. 5, the valve directs high pressure compressor air to the secondary manifold 29, even when the engine is operating. The air flow path is along line 67, through valve 43 and line 91 to manifold 29. This would be typical of when the engine is operating at low speeds. At the other extreme, as in FIG. 3, it flows metered fuel to the secondary manifold 29, effectively splitting fuel flow between the primary and secondary manifolds for an even distribution of flow. Valve 43 also functions to fill the secondary manifold with unmetered fuel as it translates from the air flow position to the fuel flow position as shown in FIG. 4. The slew rate or time required for the spool to move from one extreme to the other is controlled by bleeds in conjunction with stator annulus 96 and valve apertures 92 and 94 which effectively control the amount of fill fuel delivered to the secondary manifold. The fill fuel source is the solenoid control pressure that also translates the valve minimizing size and complexity. The fill fuel path is along line 63, solenoid 37, line 93, apertures 92, 94, 95 and 97, and annulus 96 of valve 43 to line 91 and the manifold. Pre-fill of the secondary manifold ensures that when metered flow is directed to the secondary manifold, the metered fuel that is flowing through the primary manifold does not experience a large pressure drop. Such a pressure drop would occur if the secondary manifold were empty. The fuel would seek the path of least resistance and could cause a flame out in the combustion chamber. When the solenoid commands the valve back to the purge position of FIG. 5, the secondary manifold is first vented to the solenoid control pressure which is now low. When fully translated back to the position of FIG. 5, the valve again flows high pressure air through the secondary manifold. This is also engine shut-down position.

Secondary nozzle solenoid 37 controls the operation of the secondary nozzle valve 43. When the solenoid 37 is in the de-energized position, it supplies high pressure on line 57 to position the valve 43 in the purge condition. When the solenoid 37 is energized, high pressure is supplied to the cover or right end of the valve and the valve transitions to connect a parallel flow path so that metered fuel flow is connected to both the primary and the secondary nozzles. In order to eliminate the potential of a drop in fuel flow to the engine during the transition from primary only to primary and secondary manifold fuel flow, a secondary manifold fill function is provided by annulus 96 in the stator that is supplied by high pressure. As the valve spool transitions, apertures 92 and 94 in the spool are connected to annulus 96 and the manifold is filled as a function of the valve slew velocity, hole area, annulus width, and bleed flow.

Referring again to FIGS. 1 and 2, there is a shut-off solenoid in the main fuel control 13 which, upon command from the electronic control unit 36, enables or interrupts fuel flow in line 49. This solenoid also supplies a signal pressure by way of line 47 to control the purge air valve 41. When the shut-off solenoid is energized, flow to the primary nozzles is shut off and those nozzles should be purged. The shut-off solenoid signal pressure goes high when the solenoid is energized causing the purge air valve to translate rightwardly toward the cover end connecting purge air from the compressor 19 by way of an air filter system 59, lines 55 and 51, through the secondary nozzle valve 43 and line 53 to the primary nozzles. When the shut-off solenoid is de-energized, solenoid pressure goes low, flow to the primary nozzles is turned on and the purge air valve spool translates away from the cover end toward the left as viewed to the position shown in FIG. 2, thereby disconnecting purge air from the primary nozzles. The electronic control unit 36 monitors numerous engine operating parameters and is operable in response to monitored engine parameters and other inputs to supply commands to the source of metered fuel 13 and to selectively energize the secondary nozzle control solenoid 37 and the pilot nozzle solenoid 39. The source of metered fuel or main fuel control 13 supplies a command on line 47 to the purge air valve 41 upon metered fuel flow interruption to purge the primary manifold. The electronic control unit generally oversees system operation including the illustrative operating sequence of FIG. 8.

Figure 8:
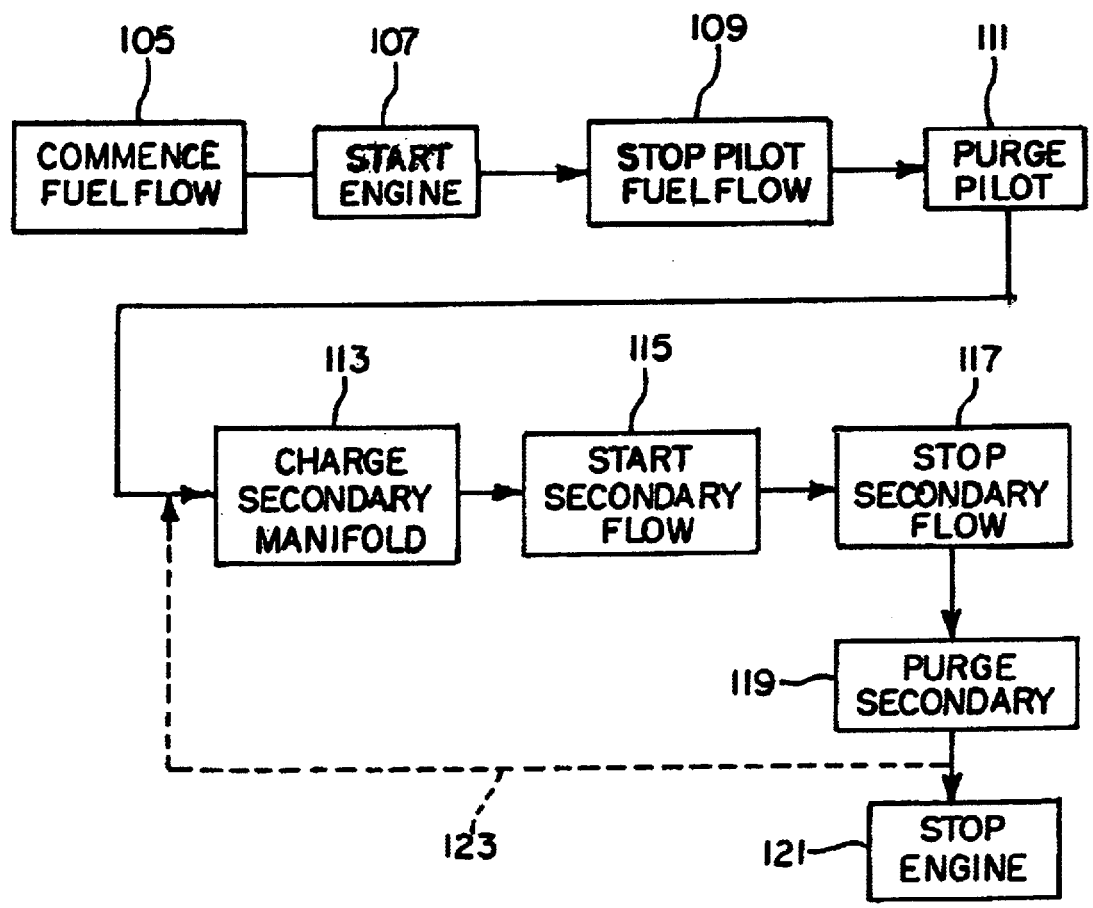
FIG. 8 is a flow chart illustrating a typical engine operation cycle according to the present invention.

In FIG. 8, upon operator command, fuel flow to the pilot and primary manifolds commences and the engine is started as shown at 105 and 107 respectively. When engine operation is established, pilot fuel flow is interrupted by the appropriate signal to solenoid 39 and purge air is supplied by way of valve 45 to force remaining fuel from the pilot manifold into the engine combustion region 21 as illustrated at 109 and 111. Subsequently, secondary manifold fuel flow may be initiated by precharging that manifold as at 113 (as valve 43 spool transitions) and then starting that fuel flow, shown at 115. When appropriate, secondary manifold fuel flow may be commanded to cease as at 117 and the secondary manifold purged as at 119. Later the engine may be shut off as indicated at 121 and the primary manifold purged by air from the compressor 19 as the engine winds down. Bi-directional line 123 indicates that the sequence 113, 115, 117 and 119 may be repeated as desired or entirely omitted under some circumstances.

What is claimed is:

1. A process of operating a gas turbine engine having a plurality of fuel manifolds each having multiple fuel nozzles for supplying fuel to an engine combustion region, comprising the steps of:
   commencing fuel flow to a pilot manifold and to a primary manifold;
   starting the engine;
   stopping fuel flow to the pilot manifold and purging remaining fuel from the pilot manifold;
   selectively charging a secondary manifold with fuel and subsequently enabling fuel flow from the secondary manifold to the engine combustion region;
   stopping fuel flow to the secondary manifold and subsequently purging fuel from the secondary manifold;
   ceasing engine operation by stopping fuel flow to the primary manifold and thereafter purging fuel therefrom, wherein
   each step of purging comprises supplying air from a pressurized source to the corresponding manifold to displace fuel therefrom into the engine combustion region, and
   the step of purging fuel from the primary manifold includes opening a purge air control valve to direct high pressure air from an intake compressor region of the engine through a purge air control valve, through a secondary manifold fuel supply valve and to the primary manifold.

2. The process of claim 1, wherein the step of purging remaining fuel from the pilot manifold includes replacing the flow of fuel through a pilot nozzle valve to the manifold with a flow of high pressure air from an intake compressor region of the engine through the pilot nozzle to the manifold.

3. The process of claim 1, wherein the step of stopping fuel flow to the pilot manifold and purging remaining fuel from the pilot manifold is commenced shortly after starting the engine by supplying air from a pressurized source to the pilot manifold to displace fuel therefrom into the engine combustion region.

4. The process of claim 3, wherein air is supplied from the pressurized source to the pilot manifold continuously during engine operation and subsequent engine shut-down.

5. The process of claim 1, wherein the steps of selectively charging a secondary manifold with fuel and subsequently enabling fuel flow from the secondary manifold to the engine combustion region, and stopping fuel flow to the secondary manifold and subsequently purging fuel from the secondary manifold are repeated several times between the steps of stopping fuel flow to the pilot manifold and ceasing engine operation.

6. The process of claim 1, wherein the step of stopping fuel flow to the secondary manifold and subsequently purging remaining fuel from the secondary manifold is achieved by supplying air from a pressurized source to the secondary manifold to displace fuel therefrom into the engine combustion region.

7. The process of claim 6, wherein air is supplied from the pressurized source to the secondary manifold continuously when the secondary manifold is not being supplied with fuel during engine operation and subsequent engine shut-down.

8. A gas turbine engine fuel supply system for selectively supplying fuel to a plurality of engine fuel manifolds, comprising:
   a source of high pressure air;
   a source of metered fuel;
   a source of unmetered fuel at a pressure higher than that of the metered fuel;
   a pilot nozzle valve operable in one condition to supply fuel from the unmetered fuel source to an engine start manifold during engine startup and in another condition to direct high pressure air from the air source to the start manifold to purge fuel from the start manifold; and
   a pilot nozzle control solenoid normally supplying unmetered pressure from the fuel supply system to control the pilot nozzle valve to said another condition, and energizable to supply pressure from the unmetered source to control the pilot nozzle valve to said one condition where unmetered fuel flows through the control solenoid and through the pilot nozzle valve to the start manifold.

9. The gas turbine engine fuel supply system of claim 8, further comprising:
   a secondary nozzle valve selectively operable in a first condition to direct high pressure air from the air source to an engine secondary fuel manifold to purge fuel from the secondary manifold, in a second condition to supply fuel from the metered fuel source to the secondary manifold, and in a third transitional condition to supply unmetered fuel from the fuel supply system to the secondary fuel manifold; and
   a secondary nozzle control solenoid normally supplying unmetered pressure from the fuel supply system to control the secondary nozzle valve to said first condition and energizable to transition from said first condition to said second condition.

10. The gas turbine engine fuel supply system of claim 9, wherein the secondary nozzle valve is operable in all three conditions to supply metered fuel to a primary fuel manifold.

11. The gas turbine engine fuel supply system of claim 10, further comprising a purge air valve coupled to the source of high pressure air and operable on command to direct high pressure air through the secondary nozzle control valve and into the primary fuel manifold to purge fuel from the primary fuel manifold.

12. A gas turbine engine fuel supply system for selectively supplying fuel to a plurality of engine fuel manifolds, comprising:
   a source of high pressure air;
   a source of metered fuel;
   a source of unmetered fuel at a pressure higher than that of the metered fuel;
   a secondary nozzle valve selectively operable in a first condition to direct high pressure air from the air source to an engine secondary fuel manifold to purge fuel from the secondary manifold, in a second condition to supply fuel from the metered fuel source to the secondary manifold, and in a third transitional condition to supply unmetered fuel from the fuel supply system to the secondary fuel manifold; and a secondary nozzle control solenoid normally supplying unmetered pressure from the fuel supply source to control the secondary nozzle valve to said first condition and energizable to transition from said first condition to said second condition.

13. The gas turbine engine fuel supply system of claim 12, wherein the secondary nozzle valve is operable in all three conditions to supply metered fuel to a primary fuel manifold.

14. The gas turbine engine fuel supply system of claim 13, further comprising a purge air valve coupled to the source of high pressure air and operable on command to direct high pressure air through the secondary nozzle control valve and into the primary fuel manifold to purge fuel from the primary fuel manifold.

15. The gas turbine engine fuel supply system of claim 14, further comprising an electronic control unit operable in response to monitored engine operating parameters to supply commands to the source of metered fuel and to selectively energize the secondary nozzle control solenoid, the fuel supply system supplying a command to the purge air valve upon metered fuel flow interruption to purge the primary manifold.

\* \* \* \* \*